(12) United States Patent
Yoshizumi et al.

(10) Patent No.: US 9,227,154 B2
(45) Date of Patent: Jan. 5, 2016

(54) GAS-LIQUID CONTACTOR AND CO2 RECOVERY UNIT

(75) Inventors: Naoyuki Yoshizumi, Tokyo (JP); Tatsuya Tsujiuchi, Tokyo (JP); Hiromitsu Nagayasu, Tokyo (JP); Toyoshi Nakagawa, Tokyo (JP); Yuichiro Sato, Tokyo (JP); Takashi Kamijo, Tokyo (JP); Shinya Kishimoto, Tokyo (JP); Yoshinori Kajiya, Tokyo (JP); Akihiko Tanigaki, Hyogo (JP); Tetsuya Maruoka, Hyogo (JP); Daijirou Ogino, Hyogo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 223 days.

(21) Appl. No.: 13/807,510

(22) PCT Filed: Apr. 25, 2011

(86) PCT No.: PCT/JP2011/060082
§ 371 (c)(1),
(2), (4) Date: Dec. 28, 2012

(87) PCT Pub. No.: WO2012/014544
PCT Pub. Date: Feb. 2, 2012

(65) Prior Publication Data
US 2013/0098248 A1    Apr. 25, 2013

(30) Foreign Application Priority Data
Jul. 29, 2010  (JP) ................. 2010-171064

(51) Int. Cl.
*B01D 53/14*  (2006.01)
*C01B 31/20*  (2006.01)

(52) U.S. Cl.
CPC ............ *B01D 53/1475* (2013.01); *C01B 31/20* (2013.01); *B01D 2252/204* (2013.01); *B01D 2257/504* (2013.01); *B01D 2259/124* (2013.01); *Y02C 10/06* (2013.01)

(58) Field of Classification Search
CPC ................... B01D 2252/204; B01D 2257/504; B01D 2259/124; B01D 53/1475; C01B 31/20; Y02C 10/06
See application file for complete search history.

(56) References Cited

U.S. PATENT DOCUMENTS

2007/0163443 A1* 7/2007 Moriyama et al. ............. 96/234
2008/0056972 A1   3/2008 Iijima
(Continued)

FOREIGN PATENT DOCUMENTS

DE    197 36 761 A1    2/1999
DE    19736761 A1 *    2/1999   ............. B01D 47/02
(Continued)

OTHER PUBLICATIONS

DE 19736761 A1 machine translation performed on Oct. 30, 2014.*
(Continued)

*Primary Examiner* — Duane Smith
*Assistant Examiner* — Cabrena Holecek
(74) *Attorney, Agent, or Firm* — Westerman, Hattori, Daniels & Adrian, LLP

(57) ABSTRACT

A gas-liquid contactor includes a plurality of spray nozzles provided in a $CO_2$ absorber, for spraying a $CO_2$ absorbent downward into the $CO_2$ absorber in which flue gas drifts upward and passes so as to bring flue gas drifting upward and the $CO_2$ absorbent into contact with each other. The spray nozzle includes a wall-surface dedicated nozzle provided along a wall surface in the $CO_2$ absorber and a liquid dispersion nozzle provided inside of the wall-surface dedicated nozzle in the $CO_2$ absorber.

8 Claims, 11 Drawing Sheets

(56) References Cited

U.S. PATENT DOCUMENTS

2009/0121039 A1* 5/2009 Van Den Berg et al. .......... 239/8
2009/0277334 A1 11/2009 Oda et al.

FOREIGN PATENT DOCUMENTS

| | | |
|---|---|---|
| DE | 197 55 571 A1 | 6/1999 |
| JP | 50-060477 A | 5/1975 |
| JP | 56-136617 A | 10/1981 |
| JP | 1-258729 A | 10/1989 |
| JP | 2506351 B | 6/1996 |
| JP | 2506351 B2 | 6/1996 |
| JP | 2001-009237 A | 1/2001 |
| JP | 2006-320828 A | 11/2006 |
| JP | 2008-062165 A | 3/2008 |
| JP | 2010-82548 A | 4/2010 |
| KE | 63-151337 A | 6/1988 |
| RU | 2001117978 A | 5/2003 |

OTHER PUBLICATIONS

Concise Explanation of Kakusaburo ONDA, "Chemical equipment design and operation series No. 2, Revised, Gas absorption", Kagaku Kogyo Sha, Jan. 30, 2001, p. 138, previously cited on Dec. 28, 2012.

Russian Decision to Grant dated Jul. 16, 2014, issued in corresponding RU application No. 2012157575 with English translation (16 pages).

Japanese Office Action dated Feb. 18, 2014, issued in corresponding JP application No. 2010-171064 with English translation (8 pages).

Edited by Kakusaburo Onda, "Chemical equipment design and operation series No. 2, Revised, Gas absorption", Kagaku Kogyo Sha, Jan. 30, 2001, p. 138.

International Search Report for PCT/JP2011/060082, mailing date of Jul. 19, 2011.

Written Opinion of PCT/JP2011/060082, mailing date of Jul. 19, 2011.

Extended European Search Report dated Mar. 7, 2014, issued in European Patent Application No. 11812139.1 (6 pages).

Canadian Notice of Allowance dated Apr. 10, 2015 issued in corresponding CA Application No. 2,883,462 (1 page).

Canadian Notice of Allowance dated May 19, 2015 issued in corresponding CA Application No. 2,804,276 (1 page).

Japanese Notice of Allowance dated Jan. 6, 2015, issued in corresponding JP Patent Application No. 2010-171064 with English translation (5 pages).

* cited by examiner

US 9,227,154 B2

GAS-LIQUID CONTACTOR AND CO2 RECOVERY UNIT

FIELD

The present invention relates to a gas-liquid contactor that supplies a processing liquid to a packed column in which absorption and distillation are performed by gas-liquid contact, and more particularly to a gas-liquid contactor such as a $CO_2$ absorber that absorbs $CO_2$ in flue gas and a $CO_2$ recovery unit.

BACKGROUND

In a packed column provided with a packed bed in which a component contained in gas is absorbed into liquid by gas-liquid contact to perform absorptive processing, it is essential to disperse and liquid into the column uniformly. The dispersion largely affects the performance of a packing material, that is, the processing performance of the packed column. Therefore, it is particularly important to disperse liquid uniformly and densely and bring liquid and gas into contact with each other.

For example, in thermal power plants using a large amount of fossil fuel, a method of removing and recovering $CO_2$ in flue gas and a method of storing recovered $CO_2$ without emitting $CO_2$ into the air by bringing flue gas generated due to burning of fossil fuel in a boiler into gas-liquid contact with an amine $CO_2$ absorbent in a $CO_2$ absorber to absorb $CO_2$ have been vigorously researched. Such a method has been used that $CO_2$ in flue gas is absorbed by the $CO_2$ absorbent in the $CO_2$ absorber, and after $CO_2$ is removed from flue gas, $CO_2$ absorbed by the $CO_2$ absorbent is diffused in a regenerator to regenerate the $CO_2$ absorbent, which is then circulated again to the $CO_2$ absorber and reused (see, for example, Patent Literature 1).

In a gas absorber such as the $CO_2$ absorber in which flue gas having the a gas form is brought into contact with the $CO_2$ absorbent having the form of a liquid, the gas-liquid contact efficiency of gas and liquid in the gas absorber largely affects the processing performance of the gas in the gas absorber. Therefore, at the time of spraying liquid into the gas absorber, liquid needs to be brought into contact with gas efficiently. In the gas absorber, a liquid distributor that sprays liquid from an upper part of the column is used, and as a method of dispersing liquid in the gas absorber, for example, a spray-type liquid distributor (see, for example, Patent Literatures 2 and 3), a trough-type liquid distributor (see, for example, Non Patent Literature 1), and a channel-type liquid distributor that distributes liquid by an amount different from each other, an element-type liquid distributor, and a tubular liquid distributor can be used.

CITATION LIST

Patent Literatures

Patent Literature 1: Japanese Patent Application Laid-open No. 2008-62165
Patent Literature 2: Japanese Patent Application Laid-open No. 2001-9237
Patent Literature 3: Japanese Patent No. 2506351

Non Patent Literature

Non Patent Literature 1: Edited by Kakusaburo ONDA, "Chemical equipment design and operation series No. 2, Revised, Gas absorption", Kagaku Kogyo Sha, Jan. 30, 2001, p. 138

SUMMARY

Technical Problem

When a spray-type liquid distributor is used in the gas absorber, a plurality of nozzles are provided in the gas absorber so that liquid is uniformly dispersed into the gas absorber by overlapping liquid spray areas on each other.

However, the distribution of a liquid to be into the column becomes lower near a wall surface of the gas absorber than inside of the gas absorber, and thus there is a problem that the absorption performance of liquid for absorbing a component contained in gas is degraded near the wall surface in the column.

Particularly, when the gas absorber is a $CO_2$ absorber, at the time of absorbing $CO_2$ contained in flue gas by the $CO_2$ absorbent, because a feed amount of the $CO_2$ absorbent is lower near the wall surface of the $CO_2$ absorber than inside of the column, the gas absorption performance of the $CO_2$ absorbent for absorbing $CO_2$, which is sprayed to near the wall surface of the $CO_2$ absorber, is degraded. Furthermore, if the amount of a $CO_2$ absorbent sprayed to the wall surface of the $CO_2$ absorber is large, an absorbed amount of $CO_2$ per amount of a $CO_2$ absorbent fed to the $CO_2$ absorber decreases. If the $CO_2$ absorbent, which has not absorbed $CO_2$ contained in flue gas, is fed to the regenerator, amine contained in the $CO_2$ absorbent is wastefully consumed, and the $CO_2$ absorbent is not efficiently used. Further, the amount of steam required for emitting $CO_2$ contained in the $CO_2$ absorbent in the regenerator increases, thereby degrading the operation efficiency of the $CO_2$ recovery unit.

Furthermore, when the spray-type liquid distributor is used in the gas absorber, a flow rate thereof can be changed according to an operation load. However, because the flow rate is proportional to an atomizing pressure, the spray atomizing pressure in a high flow rate region needs to be increased in order to accommodate from a low flow rate region to the high flow rate region, thereby causing a problem that if the spray atomizing pressure is high, the amount of mist in the air increases. Particularly, when the gas absorber is the $CO_2$ absorber, when $CO_2$ contained in flue gas is absorbed by the $CO_2$ absorbent, the $CO_2$ absorbent is entrained by flue gas, from which $CO_2$ has been recovered, thereby degrading the operation efficiency of the $CO_2$ recovery unit.

Further, when a trough-type liquid distributor is used in the gas absorber, the height of the distributor needs to be increased in order to perform a load operation according to a gas processing amount. Therefore, the material cost and manufacturing cost of the distributor, and the installation cost thereof in the gas absorber increase, and this leads to an increase of the facility cost.

The present invention has been achieved to solve the above problems, and an object of the present invention is to provide a gas-liquid contactor and a $CO_2$ recovery unit that can bring gas and liquid fed to a column into contact with each other efficiently and can realize cost reduction by dispersing liquid substantially uniformly in the column and decreasing the amount of liquid to be sprayed onto a wall surface in the column.

Solution to Problem

According to a first aspect of the present invention in order to solve the above problems, there is provided a gas-liquid contactor that sprays liquid downward into a contact column in which gas drifts upward and passes to bring the gas drifting upward and the liquid into contact with each other, the gas-liquid contactor including: a wall-surface dedicated nozzle provided along a wall surface in the contact column to spray the liquid toward inside of the contact column; and a liquid dispersion nozzle provided inside of the wall-surface dedicated nozzle in the contact column to uniformly spray the liquid into the contact column.

According to a second aspect of the present invention, there is provided the gas-liquid contactor according to the first aspect, wherein a cross-sectional shape of the contact column in a direction orthogonal to the flow direction of the gas is square.

According to a third aspect of the present invention, there is provided the gas-liquid contactor according to the second aspect, including a corner-part dedicated nozzle provided at the corner part in section of the contact column to spray the liquid toward inside of the contact column.

According to a fourth aspect of the present invention, there is provided the gas-liquid contactor according to any one of the first to third aspects, wherein the liquid dispersion nozzle and the wall-surface dedicated nozzle include two or more types of nozzles, which are used according to a flow rate of the gas.

According to a fifth aspect of the present invention, there is provided the gas-liquid contactor according to the fourth aspect, wherein the liquid dispersion nozzle includes a high-load liquid-dispersion nozzle and a low-load liquid-dispersion nozzle, and the wall-surface dedicated nozzle includes a high-load wall-surface dedicated nozzle and a low-load wall-surface dedicated nozzle, and when the flow rate of the gas is equal to or higher than a predetermined threshold, the liquid is sprayed from the high-load liquid-dispersion nozzle and the high-load wall-surface dedicated nozzle, and when the flow rate of the gas is lower than the predetermined threshold, the liquid is sprayed from the low-load liquid-dispersion nozzle and the low-load wall-surface dedicated nozzle.

According to a sixth aspect of the present invention, there is provided the gas-liquid contactor according to the fourth or fifth aspect, wherein liquid dispersion nozzles and wall-surface dedicated nozzles of different types are alternately provided in the direction orthogonal to the flow direction of the gas in the contact column.

According to a seventh aspect of the present invention, there is provided the gas-liquid contactor according to the sixth aspect, where the liquid dispersion nozzles and the wall-surface dedicated nozzles of different types are alternately provided in the flow direction of the gas in the contact column with arrangement positions of the respective nozzles being changed.

According to an eighth aspect of the present invention, there is provided a $CO_2$ recovery unit including: a $CO_2$ absorber that includes the contact column of the gas-liquid contactor according to any one of the first through seventh aspects, and by bringing flue gas containing $CO_2$ into contact with a $CO_2$ absorbent that absorbs $CO_2$ to remove $CO_2$ from the flue gas; and a regenerator that emits $CO_2$ from the $CO_2$ absorbent having absorbed $CO_2$ to regenerate the $CO_2$ absorbent.

Advantageous Effects of Invention

According to the gas-liquid contactor of the present invention, the gas-liquid contactor allows gas and liquid fed into a column to contact with each other efficiently and to realize cost reduction by dispersing liquid substantially uniformly in the column and decreasing the amount of liquid to be sprayed onto a wall surface in the column.

When a gas absorber is a $CO_2$ absorber, at the time of absorbing $CO_2$ contained in flue gas by the $CO_2$ absorbent, because a feed amount of the $CO_2$ absorbent can be made substantially uniform up to the vicinity of the wall surface of the $CO_2$ absorber, the absorption performance of the $CO_2$ absorbent for absorbing $CO_2$ can be improved. Furthermore, because the amount of the $CO_2$ absorbent sprayed onto the wall surface of the $CO_2$ absorber can be decreased, an absorbed amount of $CO_2$ per amount of the $CO_2$ absorbent fed to the $CO_2$ absorber can be increased.

By decreasing the $CO_2$ absorbent, which has not absorbed $CO_2$ contained in flue gas, to be fed to the regenerator, the $CO_2$ absorbent can be efficiently used without wastefully consuming amine contained in the $CO_2$ absorbent, and steam required for emitting $CO_2$ contained in the $CO_2$ absorbent in the regenerator can be used efficiently without any waste, thereby enabling to improve the operation efficiency of the $CO_2$ recovery unit.

DESCRIPTION OF EMBODIMENTS

The present invention is explained below in detail with reference to the accompanying drawings. The present invention is not limited to the modes for carrying out the invention (hereinafter, "embodiments"). Furthermore, constituent elements in the following embodiments include those that can be easily assumed by persons skilled in the art, that are substantially equivalent, and so-called equivalents. In addition, constituent elements in the following embodiments disclosed in the following embodiments can be combined as appropriate.

First Embodiment

Figure 1:
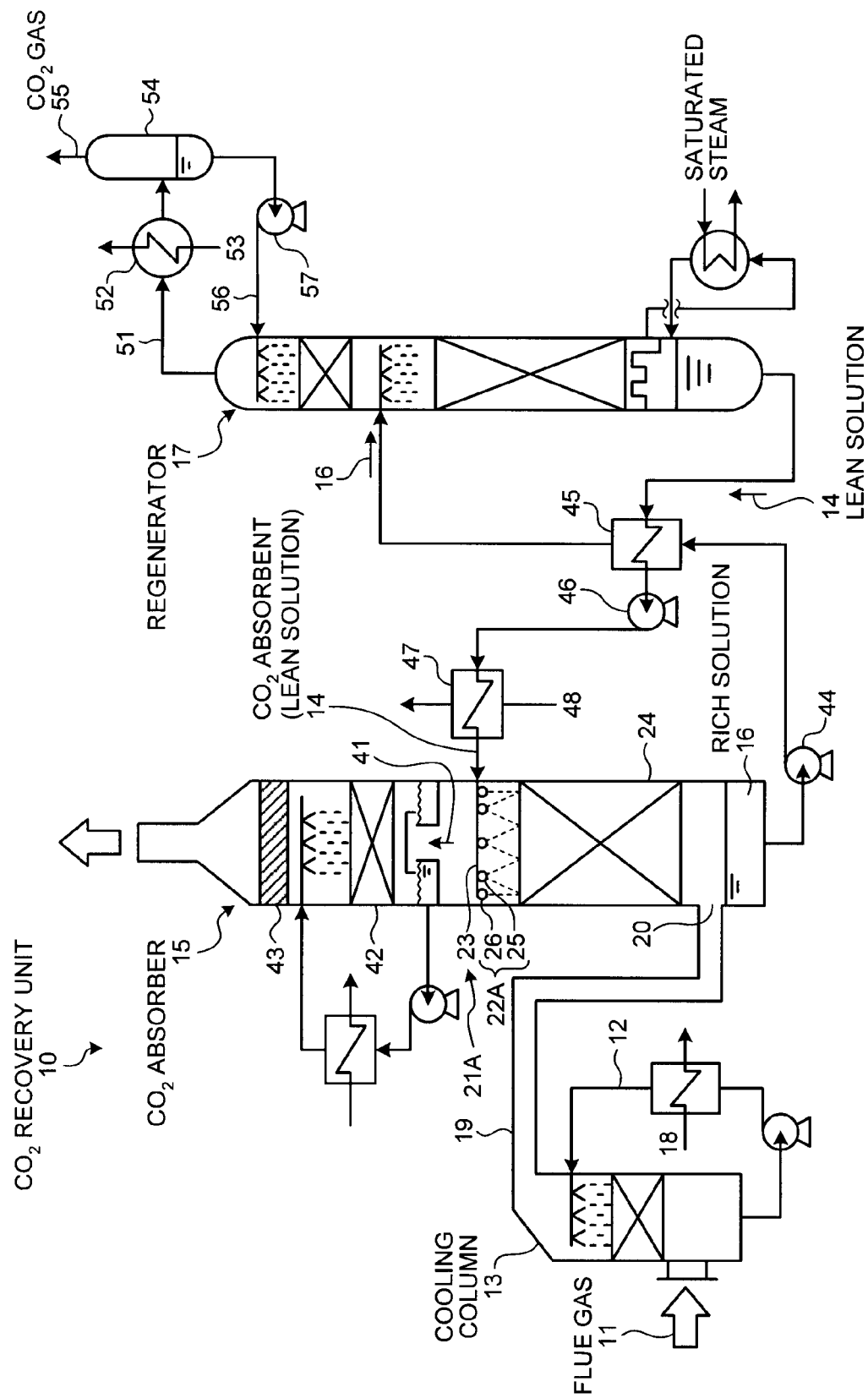
FIG. 1 depicts a configuration of a $CO_2$ recovery unit according to a first embodiment of the present invention including a gas-liquid contactor in a simplified manner.

A $CO_2$ recovery unit in which a gas-liquid contactor according to a first embodiment of the present invention is applied to a $CO_2$ absorber is explained with reference to the drawings. FIG. 1 depicts a configuration of a $CO_2$ recovery unit according to the first embodiment of the present invention including a gas-liquid contactor in a simplified manner. As shown in FIG. 1, a $CO_2$ recovery unit 10 includes a cooling column 13 that cools flue gas 11 containing $CO_2$ by water 12, a $CO_2$ absorber 15 that brings the cooled flue gas 11 into contact with a $CO_2$ absorbent 14 that absorbs $CO_2$, thereby removing $CO_2$ from the flue gas 11, and a regenerator 17 that causes $CO_2$ to be emitted from a $CO_2$ absorbent (a rich solution) 16 having absorbed $CO_2$, thereby regenerating the $CO_2$ absorbent 14.

In the $CO_2$ recovery unit 10, the $CO_2$ absorbent 14 circulates between the $CO_2$ absorber 15 and the regenerator 17, the $CO_2$ absorbent (the rich solution) 16 having absorbed $CO_2$ is fed from the $CO_2$ absorber 15 to the regenerator 17, and the regenerated $CO_2$ absorbent (a lean solution) 14 in which almost all $CO_2$ has been removed from the rich solution 16 in the regenerator 17 is fed from the regenerator 17 to the $CO_2$ absorber 15.

After the flue gas 11 containing $CO_2$ discharged from an industrial facility such as a boiler or a gas turbine is boosted by a flue gas blower or the like, the flue gas 11 is fed to the cooling column 13 and is cooled due to countercurrent contact with the water 12 in the cooling column 13. The water 12 having a high temperature due to heat exchange with the flue gas 11 is extracted from the bottom of the cooling column 13 and is cooled by cooling water 18, and is circulated and used for cooling the flue gas 11. The cooled flue gas 11 is discharged from the cooling column 13 through a flue gas duct 19 that connects the cooling column 13 to the $CO_2$ absorber 15. The flue gas 11 discharged from the cooling column 13 passes through the flue gas duct 19, and is fed to the $CO_2$ absorber 15 from a feed port 20 provided on a side wall at the bottom of the $CO_2$ absorber 15.

The $CO_2$ absorber 15 includes a gas-liquid contactor 21A that sprays the $CO_2$ absorbent 14 downward into the $CO_2$ absorber 15, in which the flue gas 11 drifts upward and passes therein, thereby bringing the flue gas 11 drifting upward into contact with the $CO_2$ absorbent 14. The gas-liquid contactor 21A includes spray nozzles 22A that sprays the $CO_2$ absorbent 14 into the $CO_2$ absorber 15, and an absorbent feed pipe 23 for feeding the $CO_2$ absorbent 14 to the respective spray nozzles 22A.

In the $CO_2$ absorber 15, in a $CO_2$ recovering unit 24 provided in a lower part of the $CO_2$ absorber 15, the flue gas 11 comes into countercurrent contact with the $CO_2$ absorbent 14 containing a basic amine compound as a base, for example, and $CO_2$ in the flue gas 11 is absorbed by the $CO_2$ absorbent 14.

Figure 2:
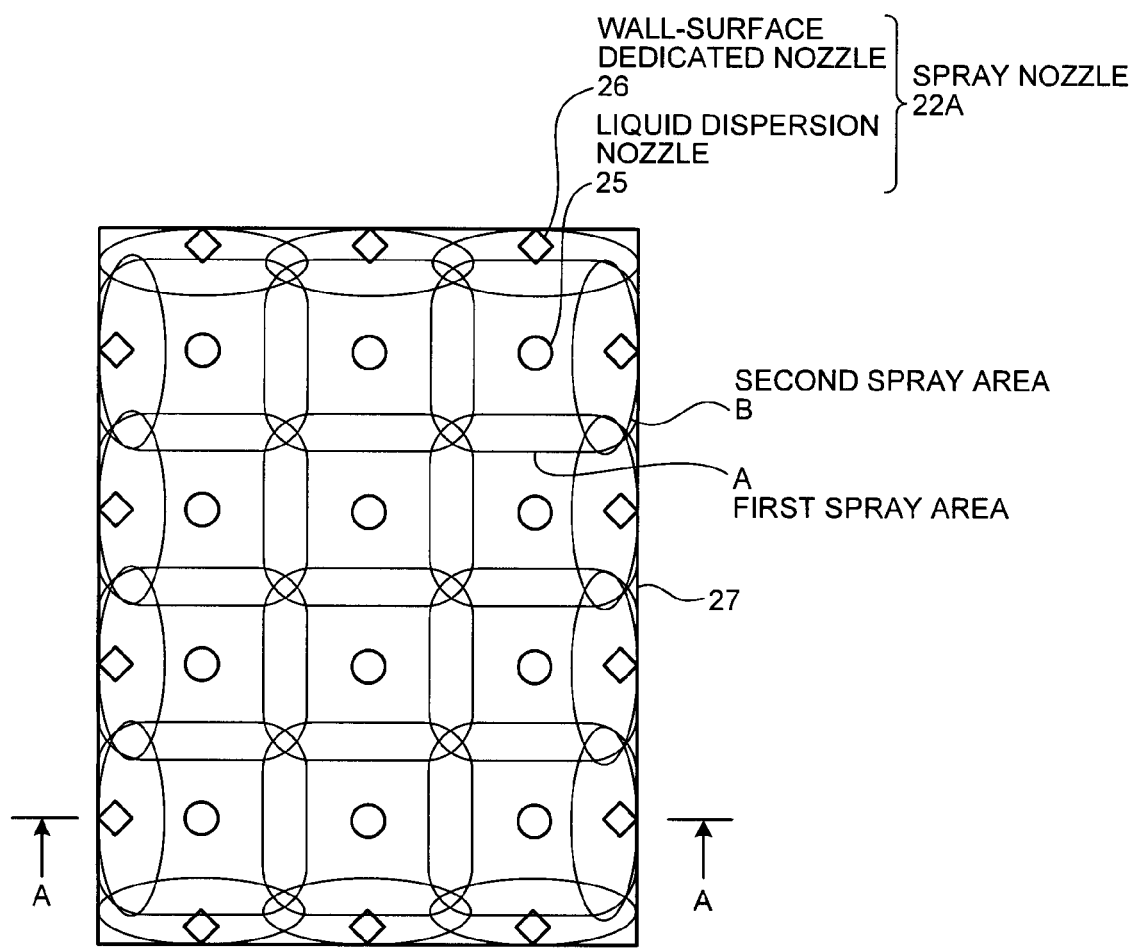
FIG. 2 depicts an arrangement of spray nozzles in a simplified manner.
Figure 3:
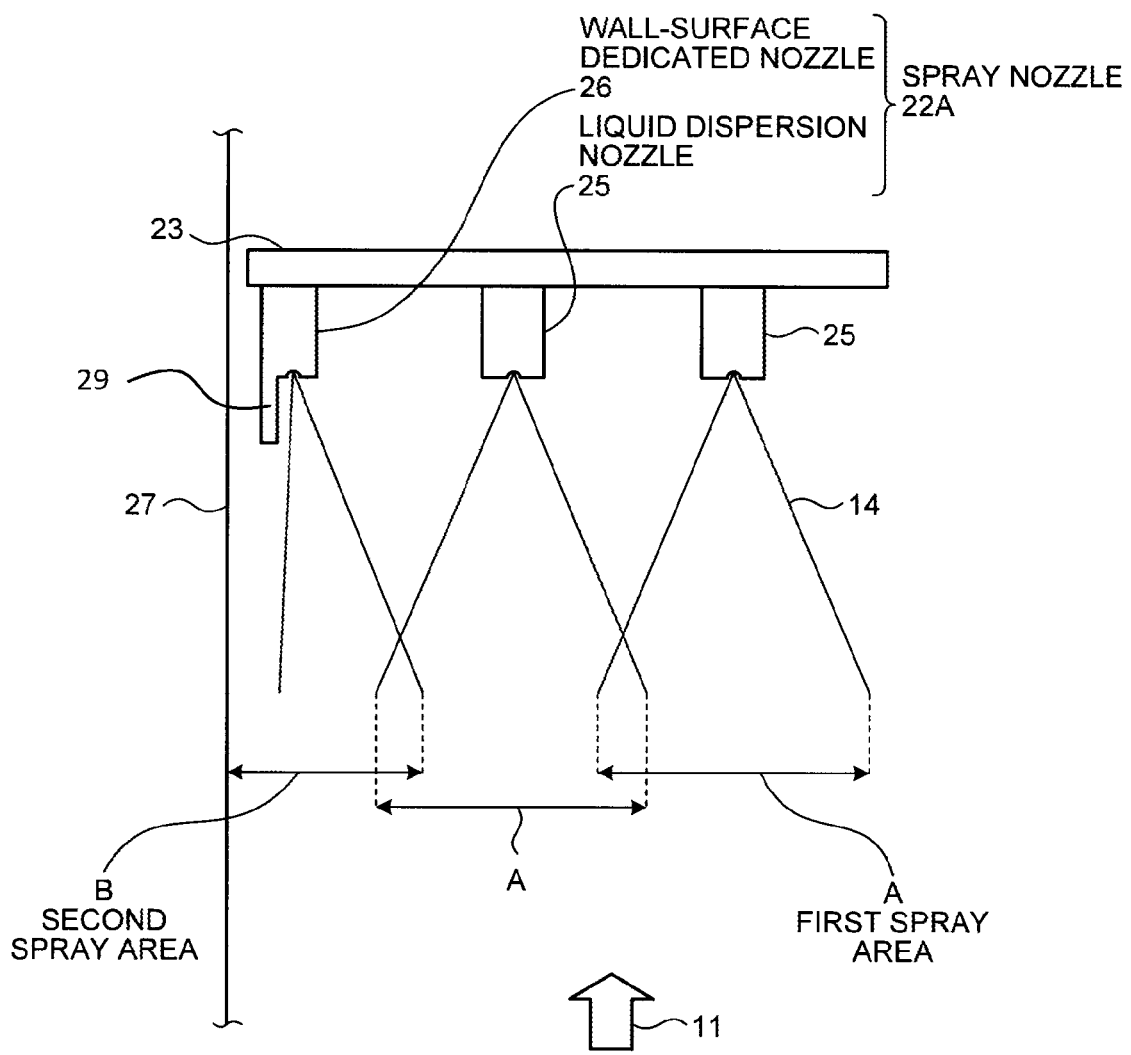
FIG. 3 schematically depicts an atomized state of a $CO_2$ absorbent sprayed from the spray nozzles.

FIG. 2 depicts an arrangement of the spray nozzles 22A in a simplified manner. FIG. 3 schematically depicts an atomized state of the $CO_2$ absorbent 14 sprayed from the spray nozzles 22A. As shown in FIGS. 2 and 3, the $CO_2$ absorber 15 has a square cross-sectional shape with respect to a flow direction of the flue gas 11. Accordingly, the number of liquid feed pipes can be increased by enlarging the cross-section in one direction without changing the arrangement of the nozzles, thereby enabling to increase the amount of processing gas and to easily realize scale-up of the $CO_2$ absorber 15.

The spray nozzle 22A includes a liquid dispersion nozzle 25 and a wall-surface dedicated nozzle 26. The liquid dispersion nozzle 25 is provided inside of the wall-surface dedicated nozzle 26 in the $CO_2$ absorber 15. The wall-surface dedicated nozzle 26 is provided along the vicinity of a wall surface 27 in the $CO_2$ absorber 15. The vicinity of the wall surface 27 refers to a state where the wall-surface dedicated nozzle 26 does not come into contact with the wall surface 27 and there is a predetermined gap between the wall-surface dedicated nozzle 26 and the wall surface 27. The liquid dispersion nozzle 25 sprays the $CO_2$ absorbent 14 substantially uniformly in a square shape in the $CO_2$ absorber 15 (a first spray area A in FIGS. 2 and 3). The first spray area A of the $CO_2$ absorbent 14 sprayed from the liquid dispersion nozzle 25 overlaps on a part of the first spray area A of the $CO_2$ absorbent 14 sprayed from other adjacent liquid dispersion nozzles 25. The quantity of water of the $CO_2$ absorbent 14 sprayed from the liquid dispersion nozzle 25 decreases as moving away from the liquid dispersion nozzle 25. However, in an area in which the quantity of water of the $CO_2$ absorbent 14 sprayed from the liquid dispersion nozzle 25 decreases, because the $CO_2$ absorbent 14 overlaps on the $CO_2$ absorbent 14 sprayed from the other adjacent liquid dispersion nozzle 25, the quantity of water of the $CO_2$ absorbent 14 in the $CO_2$ absorber 15 can be maintained substantially uniform. The shape of the first spray area A of the $CO_2$ absorbent 14 sprayed from the liquid dispersion nozzle 25 is not limited to a square shape, and other shapes such as a circle and an elliptical shape can be also used.

Figure 4:
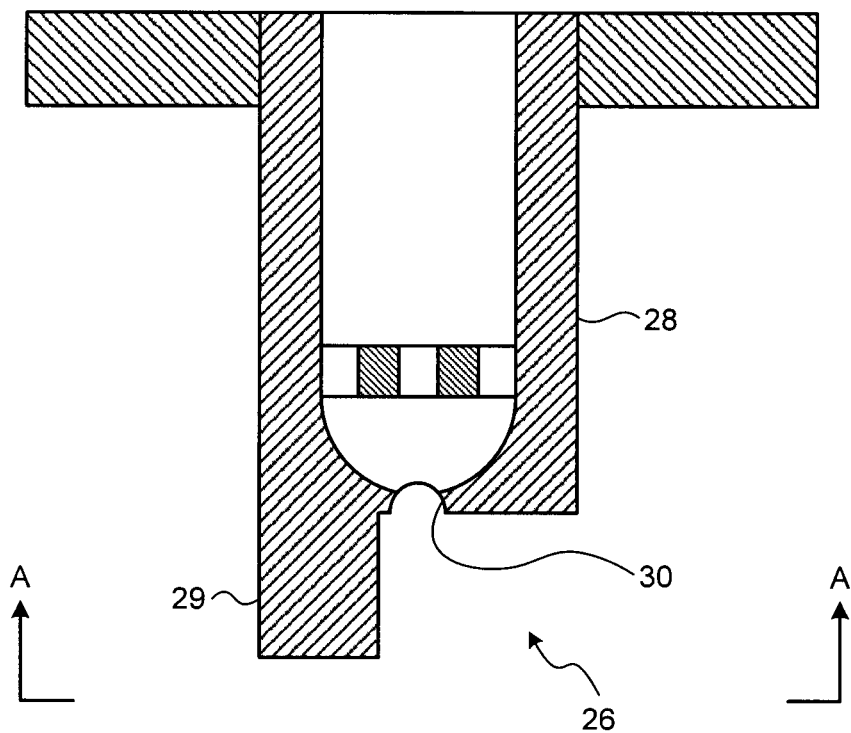
FIG. 4 depicts a cross-sectional shape of a wall-surface dedicated nozzle in a simplified manner.
Figure 5:
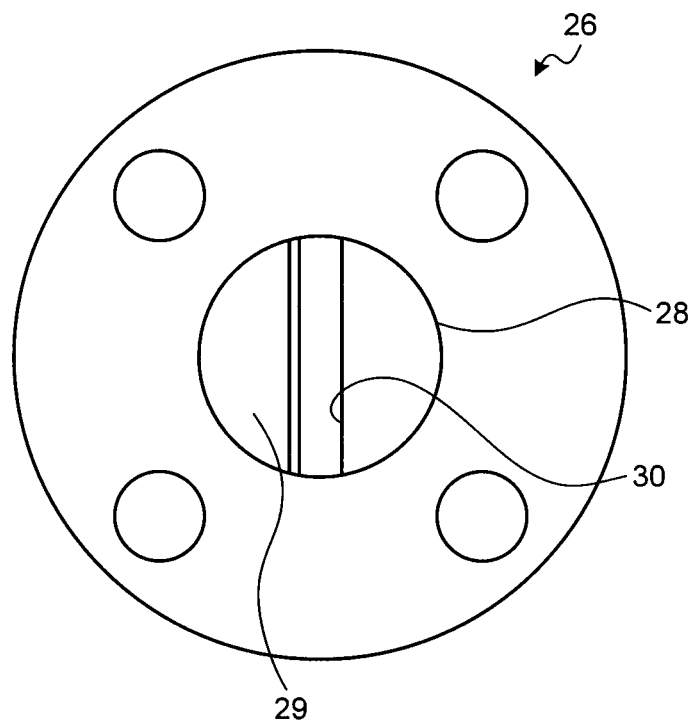
FIG. 5 is a view from a direction of A-A in FIG. 4.

The wall-surface dedicated nozzle 26 sprays the $CO_2$ absorbent 14 toward inside of the $CO_2$ absorber 15. FIG. 4 depicts a cross-sectional shape of the wall-surface dedicated nozzle 26 in a simplified manner, and FIG. 5 is a view from a direction of A-A in FIG. 4. As shown in FIGS. 4 and 5, the wall-surface dedicated nozzle 26 includes a nozzle body 28 and a shield plate 29. The shield plate 29 is provided integral with the nozzle body 28 in an extended condition on a side of the wall surface 27 of the $CO_2$ absorber 15. Therefore, the $CO_2$ absorbent 14 sprayed from a nozzle hole 30 of the wall-surface dedicated nozzle 26 hits the shield plate 29, and is sprayed to the inside of the $CO_2$ absorber 15 while suppressing that the $CO_2$ absorbent 14 is sprayed on the side of the wall surface 27 of the $CO_2$ absorber 15 (a second spray area B in FIGS. 2 and 3).

Conventionally, because the area in which the $CO_2$ absorbent 14 sprayed from sprays overlaps on each other in the $CO_2$ absorber 15 is large, a feed rate of the $CO_2$ absorbent 14 is lower near the wall surface of the $CO_2$ absorber 15 than inside of the absorber. Therefore, when $CO_2$ contained in the flue gas 11 is absorbed by the $CO_2$ absorbent 14, the gas absorption performance of the $CO_2$ absorbent 14 for absorbing $CO_2$ sprayed to near the wall surface of the $CO_2$ absorber 15 is degraded. Furthermore, if the amount of a $CO_2$ absorbent sprayed to the wall surface of the $CO_2$ absorber is large, an absorbed amount of $CO_2$ per amount of the $CO_2$ absorbent 14 fed to the $CO_2$ absorber 15 decreases, and the $CO_2$ absorbent 14 is not efficiently used. On the other hand, in the present embodiment, as shown in FIGS. 2 and 3, by providing the liquid dispersion nozzles 25 in the $CO_2$ absorber 15, the $CO_2$ absorbent 14 can be sprayed substantially uniformly into the $CO_2$ absorber 15, and by providing the wall-surface dedicated nozzles 26 along the wall surface 27 of the $CO_2$ absorber 15, it is suppressed that the $CO_2$ absorbent 14 comes into contact with the wall surface 27 of the $CO_2$ absorber 15. Accordingly, the $CO_2$ absorbent 14 sprayed into the $CO_2$ absorber 15 can be dispersed up to the vicinity of the wall surface 27 of the $CO_2$ absorber 15, with the quantity of water thereof being maintained substantially uniform.

Figure 6:
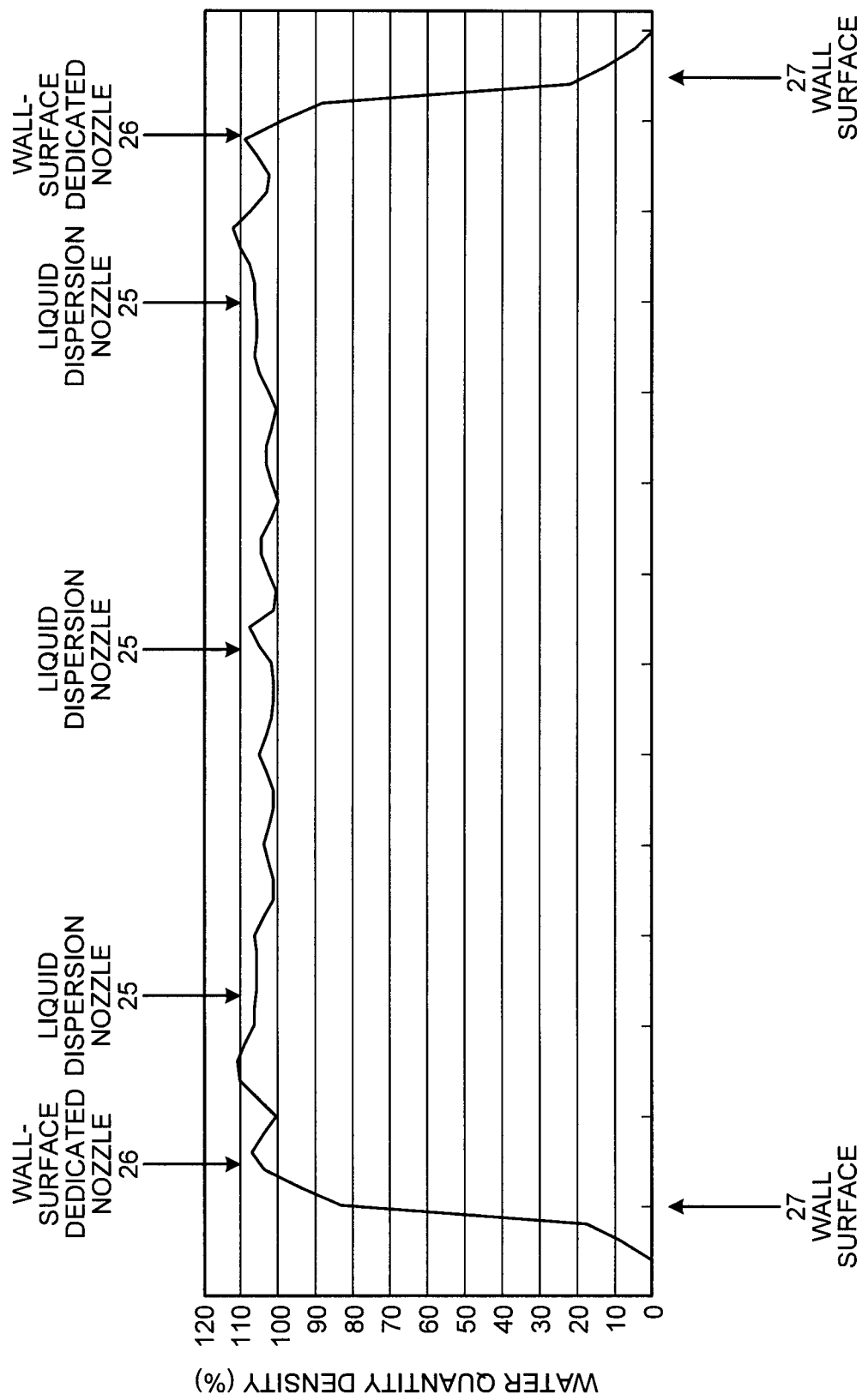
FIG. 6 schematically depicts water quantity distribution of a $CO_2$ absorbent in the direction of A-A in FIG. 2 at a cross-section of a $CO_2$ absorber.

FIG. 6 schematically depicts water quantity distribution of the $CO_2$ absorbent 14 in the direction of A-A in FIG. 2 at a cross-section of the $CO_2$ absorber 15. As shown in FIG. 6, in the $CO_2$ absorber 15, because density of water is in a range equal to or more than 90% to equal to or less than 110%, the density of water can be maintained in a distribution range of 100% (±10%), and the density of water can be maintained about 90% even on the wall surface 27 of the $CO_2$ absorber 15. The quantity of water of the $CO_2$ absorbent 14 to be fed into the $CO_2$ absorber 15 can be made substantially uniform up to the vicinity of the wall surface 27 of the $CO_2$ absorber 15. Therefore, it can be suppressed that the flue gas 11 passes through the $CO_2$ absorber 15 without coming into contact with the $CO_2$ absorbent 14. Furthermore, because the amount of the $CO_2$ absorber 15 sprayed onto the wall surface 27 of the $CO_2$ absorber 15 decreases, the amount of the $CO_2$ absorbent 14 stored at the bottom of the $CO_2$ absorber 15 without absorbing $CO_2$ in the flue gas 11 can be decreased.

Accordingly, by providing the liquid dispersion nozzles 25 in the $CO_2$ absorber 15, the $CO_2$ absorbent 14 can be dispersed substantially uniformly in the $CO_2$ absorber 15, and by providing the wall-surface dedicated nozzles 26 along the wall surface 27 of the $CO_2$ absorber 15, it can be suppressed that the $CO_2$ absorbent 14 comes into contact with the wall surface 27 of the $CO_2$ absorber 15. Therefore, the $CO_2$ absorbent 14 sprayed into the $CO_2$ absorber 15 can be dispersed, with the quantity of water thereof being made substantially uniform up to the vicinity of the wall surface 27 of the $CO_2$ absorber 15, regardless of the size of the $CO_2$ recovery unit 10 or the like.

Because the $CO_2$ absorbent 14 is fed to the liquid dispersion nozzles 25 and the wall-surface dedicated nozzles 26 via the absorbent feed pipe 23, the material cost and manufacturing cost of the distributor, and the installation cost thereof in the $CO_2$ absorber 15 are reduced as compared with a case where the trough-type liquid distributor or the like is used, thereby enabling to decrease the facility cost of the gas-liquid contactor.

Gaps between the respective nozzle holes of the liquid dispersion nozzle 25 and the wall-surface dedicated nozzle 26 are relatively different depending on the size of the respective nozzle holes and a flow rate and a spray area of the $CO_2$ absorbent 14 sprayed from the respective nozzle holes. The gaps between the respective nozzle holes of the liquid dispersion nozzle 25 and the wall-surface dedicated nozzle 26 can be set so that interference between the $CO_2$ absorbent 14 sprayed from the liquid dispersion nozzles 25 and the $CO_2$ absorbent 14 sprayed from the wall-surface dedicated nozzles 26 does not occur, for example, at the time of spraying, and the amount of the $CO_2$ absorbent 14 sprayed into the $CO_2$ absorber 15 becomes uniform.

Figure 7:
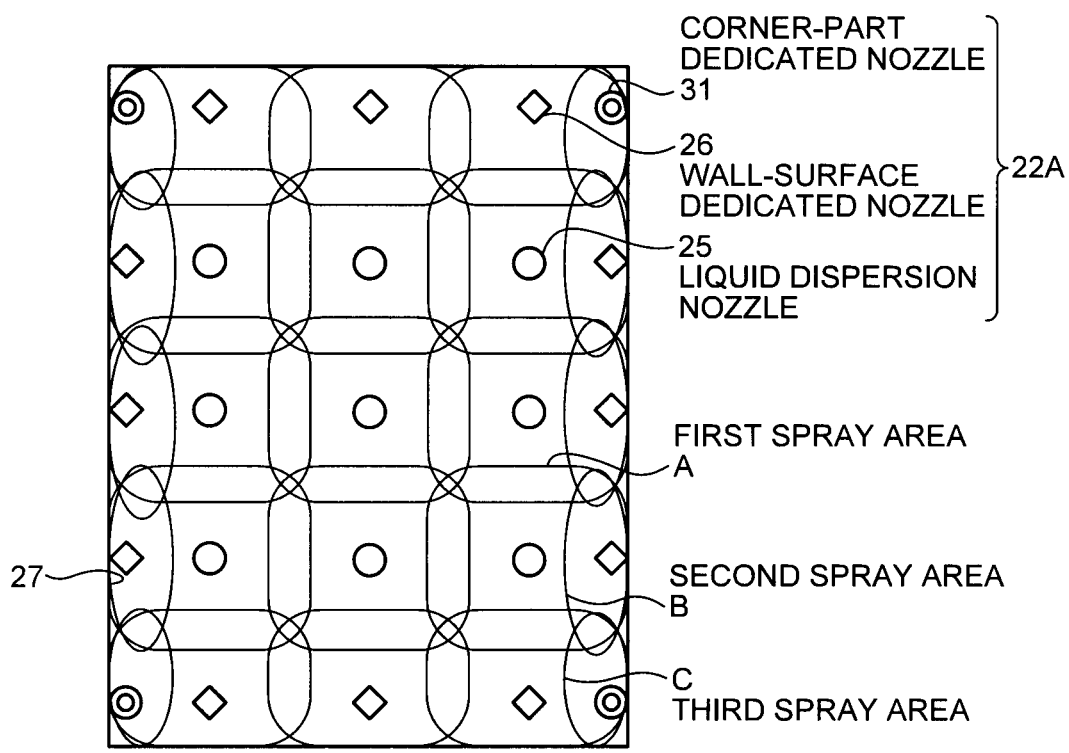
FIG. 7 depicts another configuration of the arrangement of the spray nozzles in a simplified manner.
Figure 8:
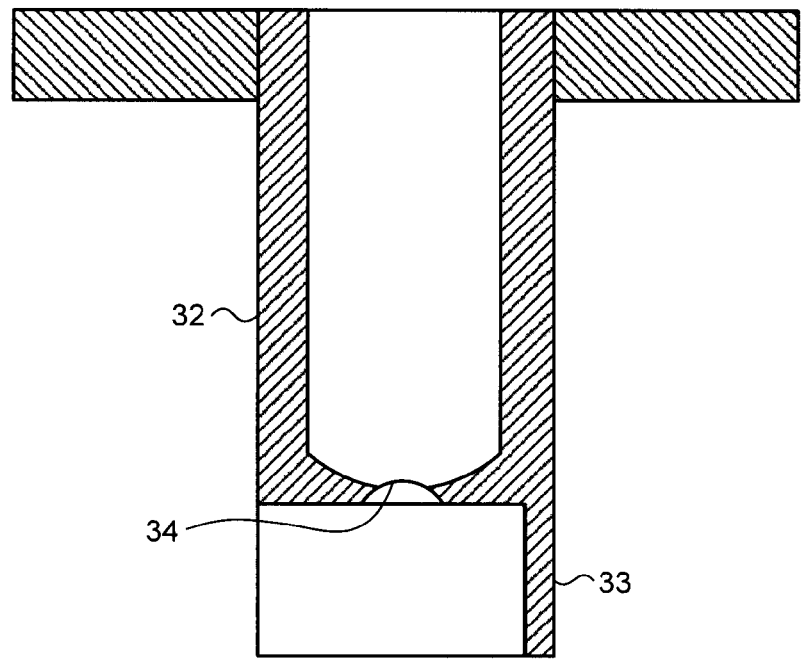
FIG. 8 depicts a cross-sectional shape of a corner-part dedicated nozzle 31 in a simplified manner.
Figure 9:
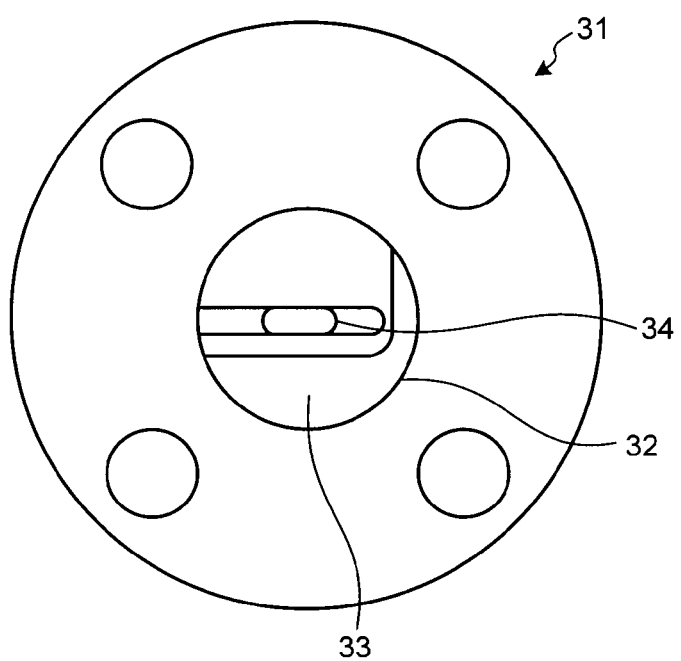
FIG. 9 is a view from a direction of A-A in FIG. 8.

The spray nozzle 22A including the liquid dispersion nozzle 25 and the wall-surface dedicated nozzle 26 is used. However, the present embodiment is not limited thereto. As shown in FIG. 7, a corner-part dedicated nozzle 31 can be provided at the corner part of the wall surface 27 of the $CO_2$ absorber 15. FIG. 8 depicts a cross-sectional shape of the corner-part dedicated nozzle 31 in a simplified manner. FIG. 9 is a view from a direction of A-A in FIG. 8. As shown in FIGS. 8 and 9, the corner-part dedicated nozzle 31 includes a nozzle body 32, and an L-shaped shield plate 33 having an L-shaped cross-sectional shape in the longitudinal direction of the nozzle body 32. The L-shaped shield plate 33 is provided integral with the nozzle body 32 in an extended condition on the side of the wall surface 27 of the $CO_2$ absorber 15. Therefore, the $CO_2$ absorbent 14 sprayed from a nozzle hole 34 of the corner-part dedicated nozzle 31 hits both surfaces of the L-shaped shield plate 33, and is sprayed to the inside of the $CO_2$ absorber 15 while suppressing that the $CO_2$ absorbent 14 is sprayed to the corner side of the wall surface 27 of the $CO_2$ absorber 15 (a third spray area C in FIG. 7). Accordingly, because the corner-part dedicated nozzle 31 sprays the $CO_2$ absorbent 14 to the inside of the $CO_2$ absorber 15, it can be suppressed that the $CO_2$ absorbent 14 sprayed from the corner-part dedicated nozzle 31 is dispersed to the corner part in a cross-section of the $CO_2$ absorber 15. Therefore, the $CO_2$ absorbent 14 can be dispersed uniformly up to the vicinity of the wall surface 27, and the amount of the $CO_2$ absorber 15 coming into contact with the wall surface 27 of the $CO_2$ absorber 15 can be decreased further. Accordingly, the amount of the $CO_2$ absorbent 14 stored at the bottom of the $CO_2$ absorber 15 without absorbing $CO_2$ in the flue gas 11 can be further decreased.

Figure 10:
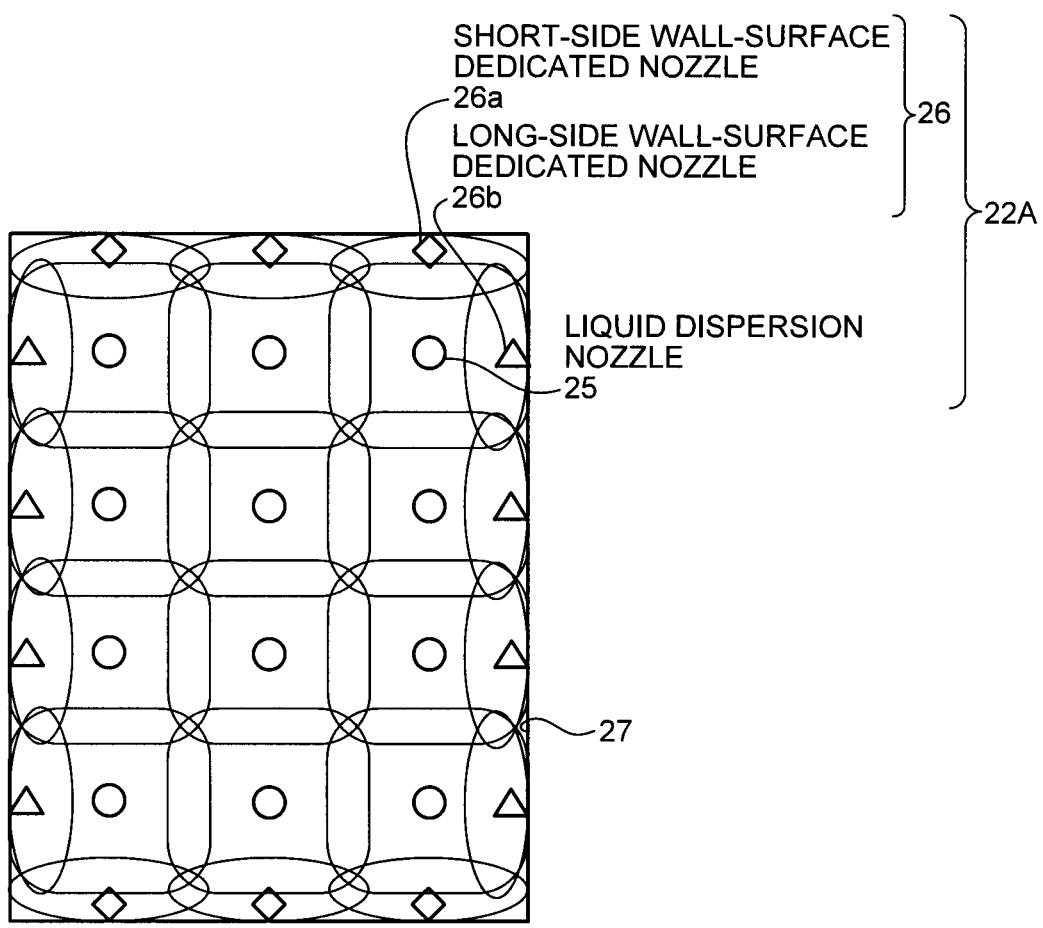
FIG. 10 is another configuration diagram of the arrangement of the spray nozzles in a simplified manner.
Figure 11:
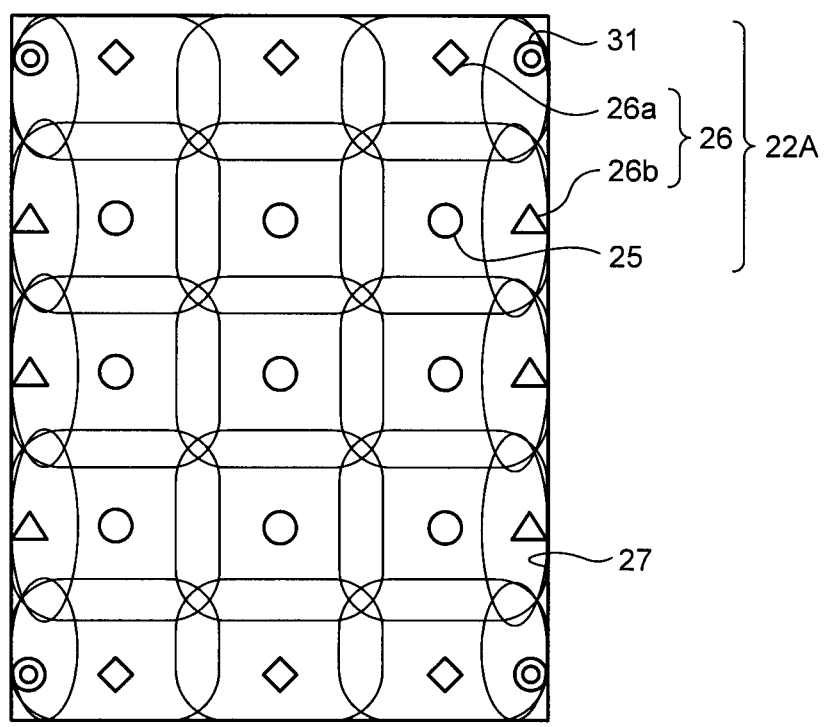
FIG. 11 is another configuration diagram of the arrangement of the spray nozzles in a simplified manner.

As the wall-surface dedicated nozzles 26, the same nozzle is provided near the wall surface 27 on a short side and a long side of the $CO_2$ absorber 15. However, the present embodiment is not limited thereto. FIGS. 10 and 11 are other configuration diagrams of the arrangement of the spray nozzles 22A. As shown in FIGS. 10 and 11, as the wall-surface dedicated nozzle 26, nozzles of different types can be provided as a short-side wall-surface dedicated nozzle 26a provided near the wall surface 27 on the short side of the $CO_2$ absorber 15 and a long-side wall-surface dedicated nozzle 26b provided near the wall surface 27 on the long side of the $CO_2$ absorber 15. Accordingly, the $CO_2$ absorbent 14 can be sprayed at an arbitrary ratio onto the short side and the long side of the $CO_2$ absorber 15.

A result of a $CO_2$ recovery rate when the gas-liquid contactor 21A according to the present embodiment is applied to the $CO_2$ absorber 15 is shown in Table 1. As shown in Table 1, when a $CO_2$ absorption rate at the time of decreasing the amount to be sprayed onto the wall surface without arranging the wall-surface dedicated nozzle 26 is designated as a reference value (1.0), the $CO_2$ absorption rate becomes about 1.1 by arranging the wall-surface dedicated nozzle 26. Accordingly, because the $CO_2$ absorption rate increases by applying the gas-liquid contactor 21A according to the present embodiment to the $CO_2$ absorber 15, the amount of the $CO_2$ absorbent 14 circulating in the $CO_2$ absorber 15 and the regenerator 17 decreases, thereby enabling to reduce the quantity of steam required for emitting $CO_2$ contained in the $CO_2$ absorbent 14 in the regenerator 17.

TABLE 1

|  | Without wall-surface dedicated nozzle 26 | With wall-surface dedicated nozzle 26 |
| --- | --- | --- |
| Rate of $CO_2$ absorption | 1.0 | 1.1 |

The cross-sectional shape of the $CO_2$ absorber 15 with respect to the flow direction of the flue gas 11 is square. However, the cross-sectional shape of the $CO_2$ absorber 15 is not limited thereto, and it can be circular or elliptical.

An atomizing pressure of the respective nozzles is set to equal to or lower than 0.2 megapascal, preferably equal to or lower than 0.15 megapascal, and more preferably equal to or lower than 0.1 megapascal. By decreasing the nozzle atomizing pressure, the pump power consumption can be decreased, and a mist scattering amount can be suppressed.

The $CO_2$ absorber 15 includes a water washing unit 42 and a demister 43 in an upper part of the $CO_2$ recovering unit 24. $CO_2$-removed flue gas 41 in which $CO_2$ has been removed is emitted to outside of the system from a column top part, after the $CO_2$ absorbent 14 entrained by the $CO_2$-removed flue gas 41 is removed by the water washing unit 42 and the demister 43. The rich solution 16 having absorbed $CO_2$ in the flue gas 11 in the $CO_2$ recovering unit 24 is stored at the bottom of the $CO_2$ absorber 15. The rich solution 16 stored at the bottom of the $CO_2$ absorber 15 is pressure-fed from a column bottom part of the $CO_2$ absorber 15 by a rich solvent pump 44 provided outside, heat-exchanged with the $CO_2$ absorbent 14 regenerated in the regenerator 17 in a rich-lean solution heat exchanger 45, and fed into the column from the column top part of the regenerator 17.

The regenerator 17 regenerates the $CO_2$ absorbent 14 as the lean solution 14 by emitting $CO_2$ from the rich solution 16. Most part of $CO_2$ in the rich solution 16 emitted into the column of the regenerator 17 from the column top part of the regenerator 17 is emitted due to the endoergic reaction, and the rich solution 16 becomes the $CO_2$ absorbent (the lean solution) 14 in which almost all $CO_2$ is removed, when reaching the column bottom part of the regenerator 17. The lean solution 14 stored at the bottom of the regenerator 17 is fed as a $CO_2$ absorbent by a lean solvent pump 46, cooled by heat exchange with cooling water 48 in a lean solvent cooler 47, and fed to the $CO_2$ absorber 15. Meanwhile, $CO_2$ gas 51 accompanied by water vapor is emitted from the column top part of the regenerator 17. The $CO_2$ gas 51 accompanied by water vapor is derived from the column top part of the regenerator 17, water vapor contained in the $CO_2$ gas 51 is condensed by cooling water 53 in a capacitor 52. After water 56 is separated in a separation drum 54, $CO_2$ gas 55 is emitted to outside of the system and recovered. Furthermore, the water 56 separated in the separation drum 54 is fed to the upper part of the regenerator 17 by a condensed-water circulation pump 57.

As described above, according to the $CO_2$ recovery unit 10 in which the gas-liquid contactor according to the present embodiment is used for the $CO_2$ absorber 15, the wall-surface dedicated nozzles 26 are provided along the vicinity of the wall surface 27 in the $CO_2$ absorber 15, and the liquid dispersion nozzles 25 are provided inside of the wall-surface dedicated nozzles 26. When the $CO_2$ absorbent 14 is sprayed into the $CO_2$ absorber 15 from the liquid dispersion nozzles 25 and the wall-surface dedicated nozzles 26, the amount of the $CO_2$ absorbent 14 sprayed onto the wall surface 27 in the column is decreased. Furthermore, the $CO_2$ absorbent 14 is dispersed substantially uniformly up to the vicinity of the wall surface 27 in the $CO_2$ absorber 15, and the flue gas 11 fed into the column can be efficiently brought into contact with the $CO_2$ absorbent 14. Accordingly, the absorption performance of the $CO_2$ absorbent 14 for absorbing $CO_2$ can be improved, it can be suppressed that the flue gas 11 passes through the $CO_2$ absorber 15 without coming into contact with the $CO_2$ absorbent 14, and the facility cost can be reduced. Further, because the amount of the $CO_2$ absorbent 14 sprayed onto the wall surface 27 of the $CO_2$ absorber 15 can be reduced, the absorbed amount of $CO_2$ per amount of the $CO_2$ absorbent 14 fed to the $CO_2$ absorber 15 can be increased. Accordingly, by suppressing that the $CO_2$ absorbent 14, which does not absorb $CO_2$ in the flue gas 11 and is stored at the bottom of the $CO_2$ absorber 15, is fed to the regenerator 17, the $CO_2$ absorbent 14 can be used efficiently without wastefully consuming amine contained in the $CO_2$ absorbent 14, and steam required for emitting $CO_2$ contained in the $CO_2$ absorbent 14 in the regenerator 17 can be efficiently used without any waste. Consequently, the operation efficiency of the $CO_2$ recovery unit 10 can be increased.

Accordingly, in the $CO_2$ recovery unit 10 in which the gas-liquid contactor according to the present embodiment is applied to the $CO_2$ absorber 15, $CO_2$ in the flue gas 11 can be absorbed by the $CO_2$ absorbent 14 efficiently and stably, without being affected by the size of the $CO_2$ recovery unit 10 or the like.

A case where the gas-liquid contactor according to the present embodiment is used for the $CO_2$ absorber 15 in the $CO_2$ recovery unit 10 is explained above. However, the present embodiment is not limited thereto, and for example, the gas-liquid contactor can be used in the cooling column 13 or the like.

Furthermore, the gas-liquid contactor according to the present embodiment is not limited to the case applied to the $CO_2$ recovery unit 10, and is applicable to any device having a spray nozzle to be used for spraying liquid downward to bring gas and liquid into contact with each other, such as a flue gas desulfurizer.

Second Embodiment

A $CO_2$ recovery unit according to a second embodiment of the present invention in which a gas-liquid contactor is applied to a $CO_2$ absorber is explained below with reference to the drawings. In the present embodiment, the gas-liquid contactor according to the second embodiment is used as a $CO_2$ absorber as in the configuration of the $CO_2$ recovery unit shown in FIG. 1. Because the configuration of the $CO_2$ recovery unit according to the present embodiment including the gas-liquid contactor is identical to that of the $CO_2$ recovery unit shown in FIG. 1, a drawing of the configuration of the $CO_2$ recovery unit is omitted, and only a drawing of the configuration of the $CO_2$ absorber is used to explain the present embodiment. Constituent elements identical to those of the $CO_2$ recovery unit shown in FIG. 1 are denoted by like reference signs and explanations thereof will be omitted.

Figure 12:
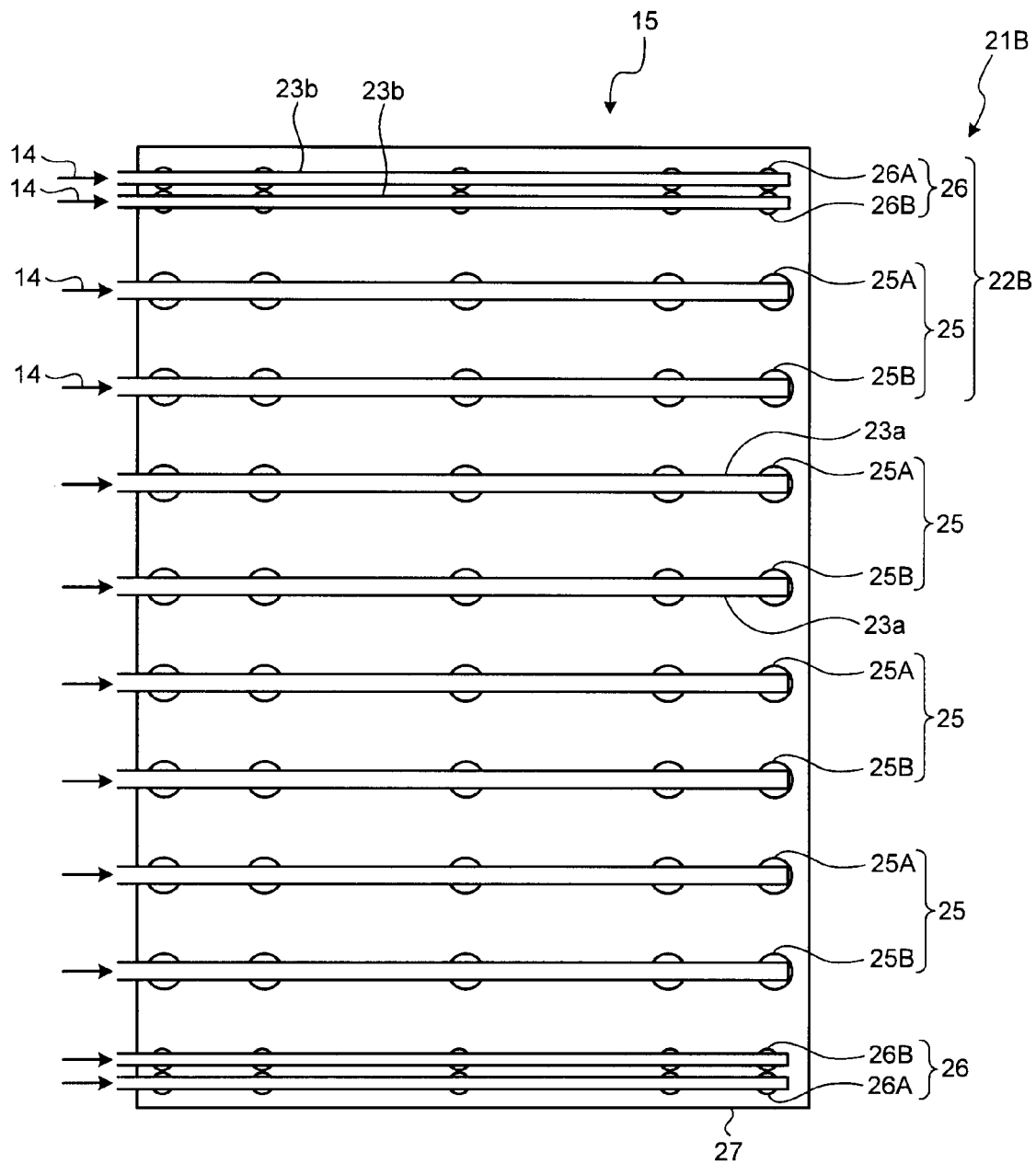
FIG. 12 depicts a configuration of a gas-liquid contactor according to a second embodiment of the present invention in a simplified manner.

FIG. 12 depicts a configuration of the gas-liquid contactor according to the second embodiment of the present invention in a simplified manner. As shown in FIG. 12, a spray nozzle 22B of a gas-liquid contactor 21B according to the present embodiment includes two types of liquid dispersion nozzles 25 and wall-surface dedicated nozzles 26 that can be used according to the load operation of the $CO_2$ recovery unit 10. The two types of nozzles are alternately provided in a direction orthogonal to a gas flow direction of the flue gas 11 in the $CO_2$ absorber 15. That is, the liquid dispersion nozzle 25 includes a high-load liquid-dispersion nozzle 25A and a low-load liquid-dispersion nozzle 25B. The wall-surface dedicated nozzle 26 includes a high-load wall-surface dedicated nozzle 26A and a low-load wall-surface dedicated nozzle 26B. The high-load liquid-dispersion nozzles 25A and the low-load liquid-dispersion nozzles 25B are alternately provided in the direction orthogonal to the gas flow direction of the flue gas 11 in the $CO_2$ absorber 15. The high-load wall-surface dedicated nozzles 26A and the low-load wall-surface dedicated nozzles 26B are alternately provided on the wall surface 27 of the $CO_2$ absorber 15 in the direction orthogonal to the gas flow direction of the flue gas 11. An absorbent feed pipe 23a feeds the $CO_2$ absorbent 14 to the high-load liquid-dispersion nozzles 25A and the low-load liquid-dispersion nozzles 25B, and an absorbent feed pipe 23b feeds the $CO_2$ absorbent 14 to the high-load wall-surface dedicated nozzles 26A and the low-load wall-surface dedicated nozzles 26B.

The $CO_2$ absorbent 14 can be sprayed from the same height in the column of the $CO_2$ absorber 15 by providing the high-load liquid-dispersion nozzles 25A and the high-load wall-surface dedicated nozzles 26A and the low-load liquid-dispersion nozzles 25B and the low-load wall-surface dedicated nozzles 26B in the $CO_2$ absorber 15.

The gas-liquid contactor 21B uses the high-load liquid-dispersion nozzles 25A or the low-load liquid-dispersion nozzles 25B and uses the high-load wall-surface dedicated nozzles 26A or the low-load wall-surface dedicated nozzles 26B according to the load operation of the $CO_2$ recovery unit 10. Accordingly, the $CO_2$ absorbent 14 can be fed in an appropriate quantity of water into the $CO_2$ absorber 15 according to the load operation of the $CO_2$ recovery unit 10.

Figure 13:
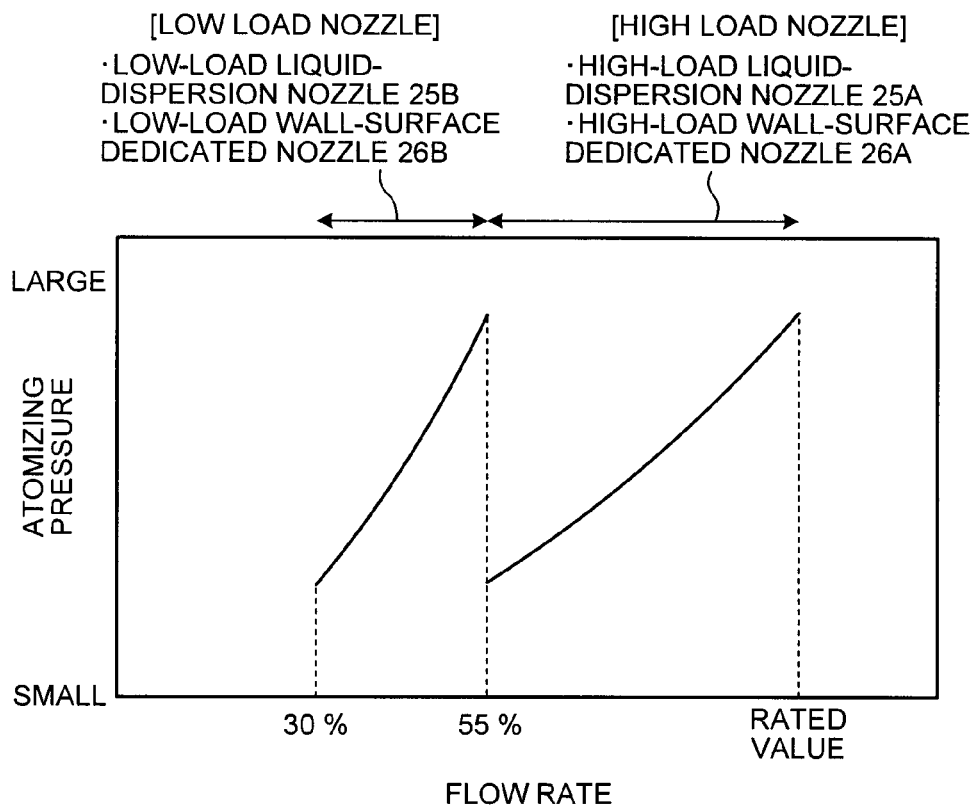
FIG. 13 is an example of a relation between a flow rate and an atomizing pressure.

The load operation of the $CO_2$ recovery unit 10 can be determined based on a flow rate of the flue gas 11 fed into the $CO_2$ absorber 15. When the flow rate of the flue gas 11 is equal to or higher than a predetermined threshold, the $CO_2$ absorbent 14 is sprayed from the high-load liquid-dispersion nozzles 25A and the high-load wall-surface dedicated nozzles 26A. When the flow rate of the flue gas 11 is lower than the predetermined threshold, the $CO_2$ absorbent 14 is sprayed from the low-load liquid-dispersion nozzles 25B and the low-load wall-surface dedicated nozzles 26B. FIG. 13 is an example of a relation between a flow rate and an atomizing pressure of a nozzle to be used. In FIG. 13, it is assumed that the predetermined threshold is 55%. As shown in FIG. 13, when the flow rate of the flue gas 11 is lower than the predetermined threshold (55%), the low-load liquid-dispersion nozzles 25B and the low-load wall-surface dedicated nozzles 26B are used to spray the $CO_2$ absorbent 14 into the $CO_2$ absorber 15. When the flow rate of the flue gas 11 is equal to or higher than the predetermined threshold (55%), the high-load liquid-dispersion nozzles 25A and the high-load wall-surface dedicated nozzles 26A are used to spray the $CO_2$ absorbent 14 into the $CO_2$ absorber 15.

By providing the high-load liquid-dispersion nozzles 25A and the high-load wall-surface dedicated nozzles 26A and using the high-load liquid-dispersion nozzles 25A or the low-load liquid-dispersion nozzles 25B according to the predetermined threshold, the atomizing pressure can be decreased under all load conditions and liquid can be dispersed uniformly. Accordingly, the amount of mist of the $CO_2$ absorbent 14 in the air caused by countercurrent contact between the flue gas 11 and the $CO_2$ absorbent 14 can be decreased. Furthermore, by decreasing the atomizing pressure of the $CO_2$ absorbent 14 to be fed into the $CO_2$ absorber 15 depending on the flow rate of the flue gas 11, the pump power of the lean solvent pump 46 and the like required for feeding the $CO_2$ absorbent 14 into the $CO_2$ absorber 15 can be decreased.

In FIG. 13, the predetermined threshold of the flow rate of the flue gas 11 for changing the use of the high-load liquid-dispersion nozzles 25A or the low-load liquid-dispersion nozzles 25B and the high-load wall-surface dedicated nozzles 26A or the low-load wall-surface dedicated nozzles 26B is set to 55% of the flow rate of the flue gas 11 as a reference. A case where the threshold of the flow rate of the flue gas 11 is 55% is explained above with reference to FIG. 3. However, the present embodiment is not limited thereto, and the flow rate can be appropriately changed according to the size of the $CO_2$ recovery unit 10 or the $CO_2$ absorber 15, and an operating condition.

Therefore, according to the $CO_2$ recovery unit in which the gas-liquid contactor according to the present embodiment is applied to the $CO_2$ absorber 15, the $CO_2$ absorbent 14 can be fed into the $CO_2$ absorber 15 corresponding to the load operation of the $CO_2$ recovery unit 10, thereby enabling to absorb $CO_2$ in the flue gas 11 by the $CO_2$ absorbent 14 more efficiently and stably.

In the present embodiment, the load operation of the $CO_2$ recovery unit 10 is determined based on the flow rate of the flue gas 11 fed into the $CO_2$ absorber 15. However, the present embodiment is not limited thereto, and the load operation of the $CO_2$ recovery unit 10 can be determined based on the $CO_2$ recovery amount, the consumption power of an air blower, or an aperture of a damper.

In the present embodiment, the high-load liquid-dispersion nozzles 25A and the low-load liquid-dispersion nozzles 25B are alternately provided in the direction orthogonal to the gas flow direction of the flue gas 11 in the $CO_2$ absorber 15. However, the present embodiment is not limited thereto, and after a plurality of high-load liquid-dispersion nozzles 25A are continuously provided in the direction orthogonal to the gas flow direction of the flue gas 11 in the $CO_2$ absorber 15, and then the low-load liquid-dispersion nozzles 25B can be provided.

In the present embodiment, when the load operation of the $CO_2$ recovery unit 10 is 55%, the high-load liquid-dispersion nozzles 25A and the high-load wall-surface dedicated nozzles 26A are used. However, the present embodiment is not limited thereto, and the low-load liquid-dispersion nozzles 25B and the low-load wall-surface dedicated nozzles 26B can be used, or the high-load liquid-dispersion nozzles 25A and the high-load wall-surface dedicated nozzles 26A, and the low-load liquid-dispersion nozzles 25B and the low-load wall-surface dedicated nozzles 26B can be used.

In the present embodiment, two types of the high-load liquid-dispersion nozzle 25A or the low-load liquid-dispersion nozzle 25B and the high-load wall-surface dedicated nozzle 26A or the low-load wall-surface dedicated nozzle 26B are used. However, the spray nozzle 22B is not limited thereto, and more than three types of the spray nozzles 22B including a medium-load nozzle in addition to the high-load nozzle and the low-load nozzle can be used.

Third Embodiment

A $CO_2$ recovery unit according to a third embodiment of the present invention in which a gas-liquid contactor is applied to a $CO_2$ absorber is explained with reference to the drawings. The gas-liquid contactor according to the present embodiment is used as a $CO_2$ absorber of the $CO_2$ recovery unit shown in FIG. 1, as in the gas-liquid contactor according to the second embodiment. Because the configuration of the $CO_2$ recovery unit according to the present embodiment in which the gas-liquid contactor is applied to the $CO_2$ absorber is identical to that of the $CO_2$ recovery unit shown in FIG. 1, a drawing of the configuration of the $CO_2$ recovery unit is omitted, and only a drawing of a part of the configuration of the $CO_2$ absorber is used to explain the present embodiment. Constituent elements identical to those of the $CO_2$ recovery unit shown in FIG. 1 are denoted by like reference signs and explanations thereof will be omitted.

Figure 14:
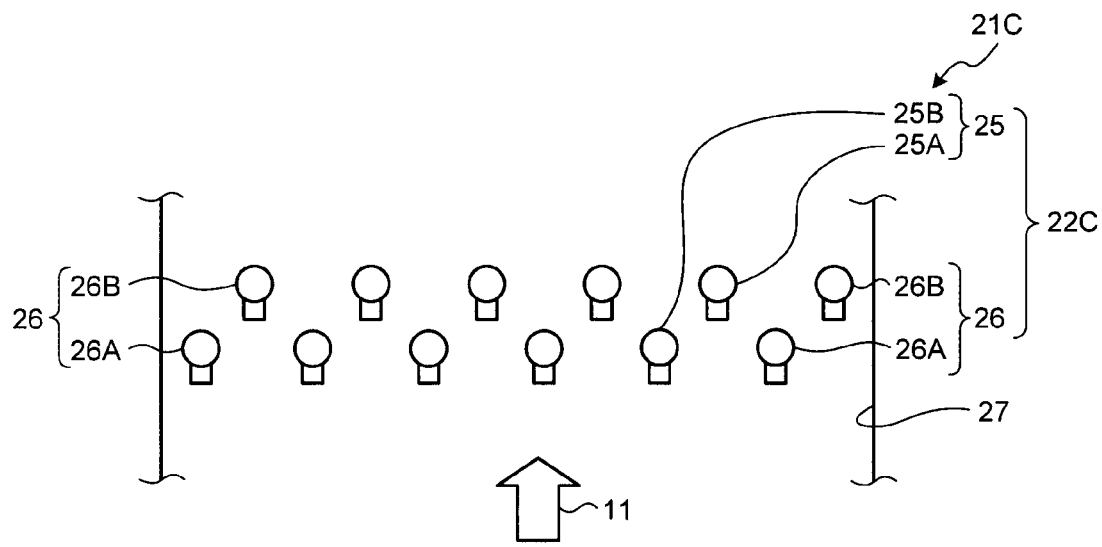
FIG. 14 depicts a configuration of a gas-liquid contactor according to a third embodiment of the present invention in a simplified manner.

FIG. 14 depicts a configuration of the gas-liquid contactor according to the third embodiment of the present invention in a simplified manner. As shown in FIG. 14, in a spray nozzle 22C of a gas-liquid contactor 21C according to the present embodiment, the high-load liquid-dispersion nozzles 25A and the low-load liquid-dispersion nozzles 25B are alternately provided in the gas flow direction of the flue gas 11 in the $CO_2$ absorber 15, and the high-load wall-surface dedicated nozzles 26A and the low-load wall-surface dedicated nozzles 26B are alternately provided in the gas flow direction of the flue gas 11 near the wall surface 27 of the $CO_2$ absorber 15. The high-load liquid-dispersion nozzles 25A and the low-load liquid-dispersion nozzles 25B are alternately provided in the direction orthogonal to the gas flow direction of the flue gas 11 in the $CO_2$ absorber 15, with arrangement positions of the respective nozzles being changed. The high-load wall-surface dedicated nozzles 26A and the low-load wall-surface dedicated nozzles 26B are alternately provided in the direction orthogonal to the gas flow direction of the flue gas 11 in the CO₂ absorber 15, with arrangement positions of the respective nozzles being changed.

The high-load liquid-dispersion nozzles 25A and the low-load liquid-dispersion nozzles 25B are alternately provided in the gas flow direction of the flue gas 11 in the CO₂ absorber 15 and arrangement positions in the direction orthogonal to the gas flow direction of the flue gas 11 are changed, and the high-load wall-surface dedicated nozzles 26A and the low-load wall-surface dedicated nozzles 26B are alternately provided in the gas flow direction of the flue gas 11 in the CO₂ absorber 15 and arrangement positions in the direction orthogonal to the gas flow direction of the flue gas 11 are changed. Accordingly, the pressure loss of the flue gas 11 at the time of passing through the gas-liquid contactor according to the present embodiment can be decreased. Therefore, the power of the air blower required for feeding the flue gas 11 into the CO₂ absorber 15 can be decreased.

In the present embodiment, the high-load liquid-dispersion nozzles 25A and the low-load liquid-dispersion nozzles 25B are provided alternately in the gas flow direction of the flue gas 11 in the CO₂ absorber 15, and the high-load wall-surface dedicated nozzles 26A and the low-load wall-surface dedicated nozzles 26B are provided alternately in the gas flow direction of the flue gas 11 on the wall surface 27 of the CO₂ absorber 15. However, the present embodiment is not limited thereto. For example, after a plurality of high-load liquid-dispersion nozzles 25A or high-load wall-surface dedicated nozzles 26A are continuously provided in the gas flow direction of the flue gas 11 in the CO₂ absorber 15, and then the low-load liquid-dispersion nozzles 25B or the low-load wall-surface dedicated nozzles 26B can be provided.

Therefore, according to the CO₂ recovery unit 10 in which the gas-liquid contactor according to the present embodiment is applied to the CO₂ absorber 15, the pressure loss of the flue gas 11 to be fed to the CO₂ absorber 15 can be decreased, thereby enabling to absorb CO₂ in the flue gas 11 into the CO₂ absorbent 14 more efficiently and stably corresponding to the load operation of the CO₂ recovery unit 10, while decreasing the power required for feeding the flue gas 11 into the CO₂ absorber 15.

REFERENCE SIGNS LIST

10 CO₂ recovery unit
11 flue gas
12, 56 water
13 cooling column
14 CO₂ absorbent
15 CO₂ absorber
16 rich solution
17 regenerator
18, 48, 53 cooling water
19 flue gas duct
20 feed port
21A to 21C gas-liquid contactor
22A to 22C spray nozzle
23, 23a, 23b absorbent feed pipe
24 CO₂ recovering unit
25 liquid dispersion nozzle
25A high-load liquid-dispersion nozzle
25B low-load liquid-dispersion nozzle
26 wall-surface dedicated nozzle
26a short-side wall-surface dedicated nozzle
26b long-side wall-surface dedicated nozzle
26A high-load wall-surface dedicated nozzle
26B low-load wall-surface dedicated nozzle
27 wall surface
28, 32 nozzle body
29 shield plate
30, 34 nozzle hole
31 corner-part dedicated nozzle
33 L-shaped shield plate
41 CO₂-removed flue gas
42 water washing unit
43 demister
44 rich solvent pump
45 rich-lean solution heat exchanger
46 lean solvent pump
47 lean solvent cooler
51, 55 CO₂ gas
52 capacitor
54 separation drum
57 condensed-water circulation pump

The invention claimed is:

1. A gas-liquid contactor for spraying liquid downward into a contact column in which gas drifts upward and passes, so as to bring the gas drifting upward and the liquid into contact with each other,
the gas-liquid contactor comprising:
a wall-surface dedicated nozzle provided along a wall surface in the contact column, for spraying the liquid toward inside of the contact column; and
a liquid dispersion nozzle provided closer to the center of the contact column than the wall-surface dedicated nozzle in the contact column, for uniformly spraying the liquid into the contact column,
wherein the wall-surface dedicated nozzle includes a nozzle body and a shield plate, and
the shield plate is provided integral with the nozzle body and extends only on a side of the wall surface of the contact column.

2. The gas-liquid contactor according to claim 1, wherein a cross-sectional shape of the contact column in a direction orthogonal to the flow direction of the gas is square.

3. The gas-liquid contactor according to claim 2, further comprising a corner-part dedicated nozzle provided at the corner part in section of the contact column, for spraying the liquid toward inside of the contact column.

4. The gas-liquid contactor according to claim 1, wherein the liquid dispersion nozzle and the wall-surface dedicated nozzle include two or more types of nozzles, which are used according to a flow rate of the gas.

5. The gas-liquid contactor according to claim 4, wherein
the liquid dispersion nozzle includes a high-load liquid-dispersion nozzle and a low-load liquid-dispersion nozzle, and
the wall-surface dedicated nozzle includes a high-load wall-surface dedicated nozzle and a low-load wall-surface dedicated nozzle, and wherein
when the flow rate of the gas is equal to or higher than a predetermined threshold, the liquid is sprayed from the high-load liquid-dispersion nozzle and the high-load wall-surface dedicated nozzle, and
when the flow rate of the gas is lower than the predetermined threshold, the liquid is sprayed from the low-load liquid-dispersion nozzle and the low-load wall-surface dedicated nozzle.

6. The gas-liquid contactor according to claim 4, wherein liquid dispersion nozzles and wall-surface dedicated nozzles of different types are alternately provided in the direction orthogonal to the flow direction of the gas in the contact column.

7. The gas-liquid contactor according to claim 6, wherein
the liquid dispersion nozzles and the wall-surface dedicated nozzles of different types are alternately provided in the flow direction of the gas in the contact column, and
the liquid dispersion nozzles and the wall-surface dedicated nozzles of different types are alternately provided in the direction orthogonal to the flow direction of the gas in the contact column, with arrangement positions of the respective nozzles being changed.

8. A $CO_2$ recovery unit comprising:
a $CO_2$ absorber including the contact column of the gas-liquid contactor according to claim 1, the $CO_2$ absorber for bringing flue gas containing $CO_2$ into contact with a $CO_2$ absorbent that absorbs $CO_2$ so as to remove $CO_2$ from the flue gas; and
a regenerator for emitting $CO_2$ from the $CO_2$ absorbent having absorbed $CO_2$ so as to regenerate the $CO_2$ absorbent.

* * * * *